United States Patent

Tour

[11] Patent Number: 5,579,733
[45] Date of Patent: Dec. 3, 1996

[54] ROTARY ENGINE WITH ABUTMENTS

[76] Inventor: Benjamin Tour, 19 Hanasi Harishon, Rehovot, Israel, 76302

[21] Appl. No.: 20,578

[22] Filed: Feb. 22, 1993

Related U.S. Application Data

[63] Continuation-in-part of Ser. No. 784,927, Oct. 30, 1991, abandoned, which is a continuation-in-part of Ser. No. 698,549, May 10, 1991, abandoned.

[51] Int. Cl.⁶ .................................................... F02B 53/00
[52] U.S. Cl. .......................................... 123/228; 418/247
[58] Field of Search .............................. 123/228; 418/247

[56] References Cited

U.S. PATENT DOCUMENTS

| | | | |
|---|---|---|---|
| 6,962 | 12/1849 | Thompson | 418/247 |
| 987,486 | 3/1911 | Peterson et al. | |
| 1,061,107 | 5/1913 | Nordmark | 418/247 |
| 1,280,915 | 10/1918 | Weidenbach | |
| 1,721,855 | 7/1929 | Burrow | 123/228 |
| 1,846,298 | 2/1932 | Alcznauer | 123/228 |
| 2,045,081 | 6/1936 | Hart | 418/247 |
| 3,040,530 | 6/1962 | Yalnizyan | |
| 3,323,500 | 6/1967 | Murin | 123/228 |
| 3,949,712 | 4/1976 | Thaler | |
| 4,086,881 | 5/1978 | Rutten | |
| 4,683,852 | 8/1987 | Kypreos-Pantazis | |
| 4,895,117 | 1/1990 | Yang | |

FOREIGN PATENT DOCUMENTS

| | | |
|---|---|---|
| 1131238 | 10/1956 | France . |
| 356724 | 7/1922 | Germany . |
| 4627 | 6/1900 | United Kingdom . |

Primary Examiner—Michael Koczo
Attorney, Agent, or Firm—Ladas & Parry

[57] ABSTRACT

A rotary motor with a pair of abutments that move relative to a rotor through the rotation of gears operatively connected to both the abutments and the rotor. The abutments and rotor are located within a housing such that the inner cavity of the housing is divided into four chambers. The rotor has a pair of blade sections that are in constant contact with the motor housing, so that the chambers are always sealed from each other. Also connected to the housing are a pair of intake ports and a pair of exhaust ports. The rotor rotates within the inner cavity pushing air from the intake ports to the exhaust ports. The abutments are constructed to move in a linear direction, to allow the blade sections to rotate from one chamber to another. The movement of the abutments is synchronous with the rotation of the rotor, so that the abutments are always in contact with the rotor to insure that there is negligible fluid communication between chambers. The abutments are connected to the rotor through a pair of gears that are external to the inner cavity of the housing. The gears are attached to a crankshaft that translates the rotation of the rotor into a linear movement of the abutments. The blade sections of the rotor each have a pair of concave surfaces with an outline which insures that the abutments and rotor are always in contact with each other.

21 Claims, 5 Drawing Sheets

ROTARY ENGINE WITH ABUTMENTS

BACKGROUND OF THE INVENTION

This application is a continuation-in-part of application Ser. No. 781,927 filed on Oct. 30, 1991, abadoned, which is a continuation-in-part of application Ser. No. 698,549, filed on May 10, 1991 abandoned.

1. Field of the Invention

The present invention relates to rotary motors.

2. Description of Related Art

Rotary motors are an alternative to conventional four stroke piston driven engines. A typical rotary motor will have a rotor that rotates within a housing to push air into a combustion chamber, wherein the air is combusted with fuel into a pressurized gas that pushes the rotor back through another cycle. Rotary engines eliminate the need for a crankshaft and other parts that are required in a piston engine to convert the translational movement of the pistons into a rotation of the driveshaft. The rotary engine is thus lighter, mechanically more efficient and less complex than conventional four stroke engines.

U.S. Pat. No. 3,040,530 issued to Yalnizyan discloses a rotary engine that has a pair of abutments, that together with the rotor divide the inner cavity of the housing into four chambers. The air ports and combustion chamber are located in the housing to create a four stroke cycle engine. The abutments are pushed up by the cam surface of the rotor, to allow the rotor to rotate within the motor housing. The rotor pushes air and exhaust between the combustion chamber and the air ports. For such a rotary motor to work effectively, the various chambers must be sealed relative to each other. This requires that the abutments remain in constant contact with the rotor during the engine cycle.

As shown in Yalnizyan, springs are attached to the abutments to bias the members against the rotor, so that the abutments follow the cam surface of the rotor. The spring force causes excessive wear on both the rotor and abutments, which degrades the seal and reduces the overall efficiency of the engine. This degradation of the seal requires the engine to be continuously repaired. Repairing the main components of an engine is time consuming and costly. It would therefore be desirable to have a rotary engine that greatly reduces the wear between the abutments and the rotor.

SUMMARY OF THE INVENTION

The present invention is a rotary motor with a pair of abutments that move relative to a rotor, through the rotation of gears operatively connected to both the abutments and the rotor. The abutments and rotor are located within a housing such that the inner cavity of the housing is divided into four chambers. The rotor has a pair of blade sections that are in constant contact with the motor housing, so that the chambers are essentially sealed from each other. Also connected to the housing is an intake port, an exhaust port and two ports that allow fluid communication between the inner cavity and a combustion chamber. The rotor rotates within the inner cavity pushing air from the intake ports to the exhaust ports. The abutments are constructed to move in a linear direction, to allow the blade sections to rotate from one chamber to another. The movement of the abutments is synchronous with the rotation of the rotor, so that the abutments are always in contact with the rotor to insure that there is negligible fluid communication between chambers. The abutments are connected to the rotor through a pair of gears that are external to the inner cavity of the housing. The gears are attached to a crankshaft that translates the rotation of the rotor into a linear movement of the abutments. The blade sections of the rotor each have a pair of concave surfaces with an outline which insures that the abutments and rotor are always in contact with each other.

The coupling of the abutments to the rotors through an external gear linkage mechanism minimizes the force applied to the rotor by the abutments. Such an arrangement thus greatly reduces the wear and increases the life of the seal between the rotor and abutments, and increases the efficiency of the engine as a whole. The output torque of the rotor that is required to move the abutments is also reduced, improving the efficiency of the motor over engines in the prior art. The gears preferably have a 2:1 turn ratio so that the abutments move from an extended position to a fully retracted position twice every 360 degrees of rotor rotation.

Therefore it is an object of this invention to provide a rotary motor that externally couples the movement of the abutments to the rotation of the rotor, to provide a continuous, smooth and accurate dynamic engagement between the abutments and rotor.

It is also an object of this invention to provide a mechanism that greatly reduces the amount of wear on the rotors and abutments of a rotary motor.

BRIEF DESCRIPTION OF THE DRAWINGS

The objects and advantages of the present invention will become more readily apparent to those skilled in the art after reviewing the following detailed description and accompanying drawings, wherein.

DETAILED DESCRIPTION OF THE INVENTION

Figure 1:
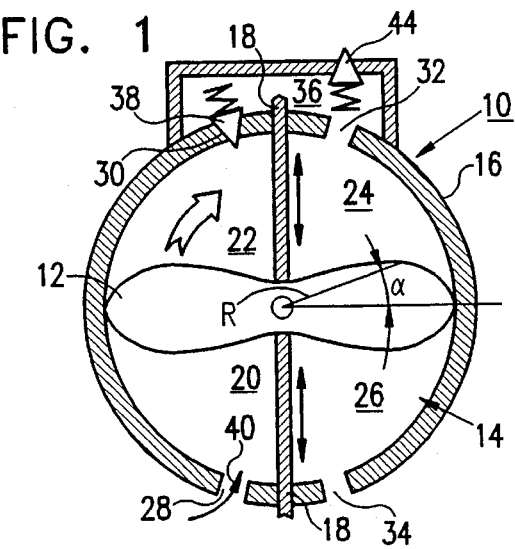
FIG. 1 is a cross-sectional view of a rotary engine of the present invention.

Referring to the drawings more particularly by reference numbers, FIG. 1 is a rotary motor 10 of the present invention. The motor 10 has a rotor 12 that can rotate within an inner cavity 14 of a housing 16. Also within the inner cavity 14 is a pair of abutments 18 that can move relative to the housing 16 in the directions indicated by the arrows. The abutments 18 and rotor 12 define a first 20, a second 22, a third 24 and a fourth 26 chamber within the housing 16. The housing 16 also has first 28, second 30, third 32 and fourth 34 ports that allow fluid communication between the inner cavity 14 and an outside source.

In the preferred embodiment the motor 10 has a combustion chamber 36 that is in fluid communication with the inner cavity 14 through the second 30 and third 32 ports. The combustion chamber 36 may have a first one-way valve 38 that allows fluid to only flow from the second chamber 22 to the chamber 36. The first port 28 is connected to a source of air 40, such that air 40 can enter the first chamber 20 through port 28. The fourth port 34 is coupled to an exhaust system (not shown) that allows exhaust gases to flow from the fourth chamber 26.

Figure 2:
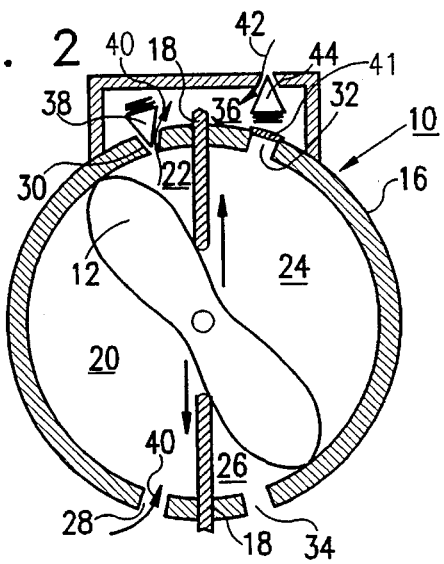
FIG. 2 is a cross-sectional view similar to FIG. 1, showing a rotor rotated such that air is pushed from a second chamber into a combustion chamber.
Figure 3:
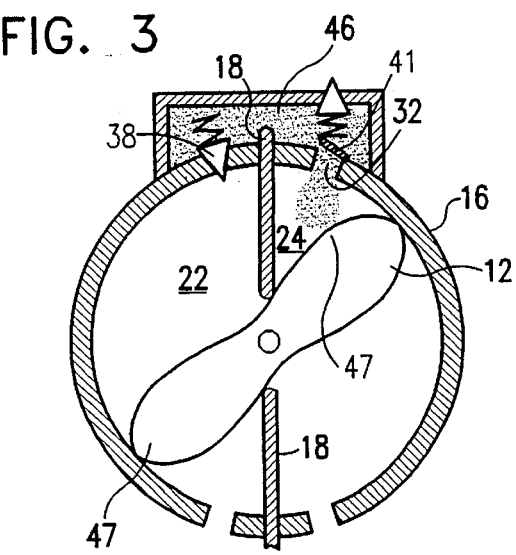
FIG. 3 is a cross-sectional view similar to FIG. 1, showing the rotor rotated to a position wherein the air is combusted with fuel in the combustion chamber.

In operation, the rotor 12 rotates within the housing 26. As shown in FIG. 2, the motor 10 may include a valve 41 that initially blocks the port 32 when the engine is started. As the rotor 12 rotates air is compressed into the combustion chamber 36. Fuel 42 is also introduced into the chamber 36 through a second one-way valve 44. The fuel 42 is continuously added while air is flowing into the combustion chamber 36. A fuel nozzle is preferable to incorporate fuel injection. As shown in FIG. 3, the fuel 42 and air 40 are ignited in the combustion chamber 36 to create a pressurized gas 46. At this point the valve 41 is opened, where it remains until the motor is shutdown and restarted.

Figure 4:
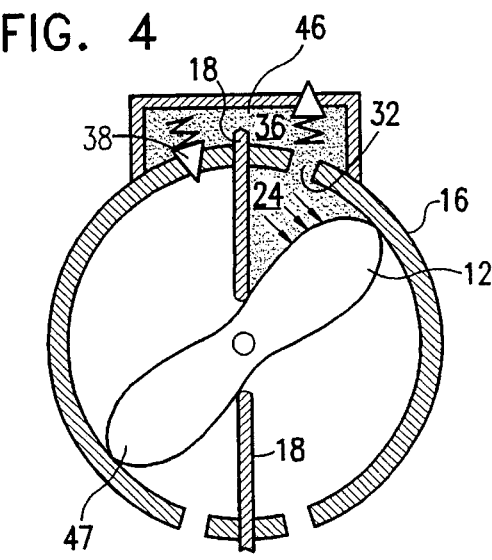
FIG. 4 is a cross-sectional view similar to FIG. 1, showing the pressurized gas created by the combusted fuel/air mixture entering a third chamber and pushing the rotor.
Figure 5:
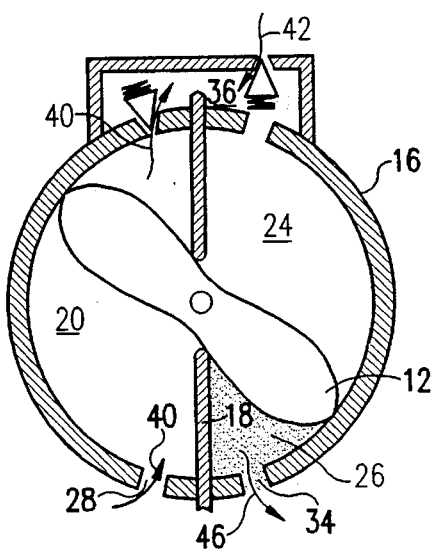
FIG. 5 is a cross-sectional view similar to FIG. 1, showing the rotor pushing the exhaust gas out of an exhaust port.

As shown in FIG. 4, the pressurized gas 46 flows into the third chamber 24 and applies a force against the rotor 12 to rotate the same within the housing 16. The gas pressure within the chamber 36 also keeps the valve 38 closed, so that as the rotor 12 rotates, the air within the second chamber 22 is compressed. While the air is being compressed, the pressure of the gas decreases, due to the increasing volume of the third chamber 24 as the rotor rotates away from the third port 32. The valve 38 remains closed until the pressure of the compressed air within the first chamber 22 is greater than the gas pressure within the chamber 36. As shown in FIG. 5, the compressed air then flows into the combustion chamber 36. The air continues to flow into the flow into the combustion chamber, because of the changing volumes in the second 22 and third 24 chambers. The intake of air into the combustion chamber pushes out the exhaust and provides air for another combustion cycle. Further rotation of the rotor 12 pushes the exhaust through the fourth port 34 as another combustion cycle is occurring.

The motor operates in a standard Otto cycle, wherein the air is compressed (increasing pressure and decreasing volume) in the second chamber 22 when the intake valve 38 is closed, the pressure within the working chamber (chambers 24 and 36) increases during combustion, and the pressure decreases while the volume increases as the rotor 12 rotates from the third port 32 to the fourth port 34.

The present invention thus provides a motor that requires only one valve in the combustion chamber during the operation cycle of the engine. Because there is no "exhaust valve" in the combustion chamber 36, there is a point where the fourth port 34 is in fluid communication with the second port 30 (when the rotor 12 is between the second 30 and third 32 ports) and the compressed air can flow out of the working chamber. Because this situation occurs for a relatively short time, it is believed that there is a negligible pressure drop in the combustion chamber. For example, if the rotor rotates at a speed of 3000 revolutions per minute (RPM), then the fourth port 34 will be in communication with the combustion chamber 36 for less than 1 millisecond.

The one valve combustion chamber also provides an engine stroke that is continuous because the gas pressure is always driving the rotor. Unlike engines of the prior art, there is no closing of an exhaust valve to interrupt the flow of gas from the combustion chamber. The continuous flow is particularly efficient in producing rotor speeds in the range of 6000 RPM. Additionally, the motor 10 provides an increasing pressure ratio as the engine load increases. The higher pressure ratio improves the efficiency of the engine.

As shown in FIGS. 2–5 the abutments 18 move relative to the rotor 12 so that the chambers 20–26 are always separated. The abutments 18 preferably have a seal at one end that is in constant contact with the rotor 12. The blade sections 47 of the rotor 12 may also have a seal that is in constant contact with the housing 16. The seals prevent fluid communication between the chambers during the pressurization and depressurization of the same. The movement of the abutments 18 is synchronized with the rotation of the rotor 12, so that the abutments 18 are always in contact with the rotor 12. Likewise the blade sections 47 of the rotor 12 are always in contact with the housing 16.

Figure 6:
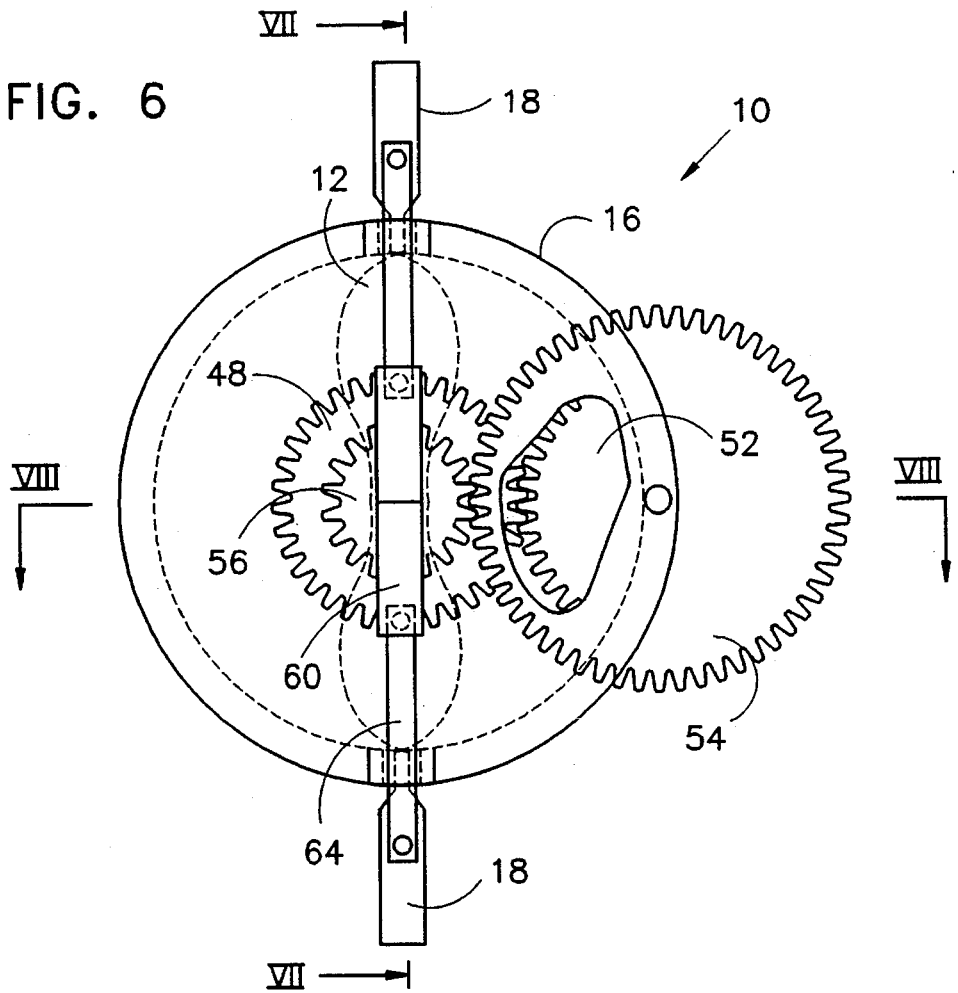
FIG. 6 is a side view of the rotary motor with a pair of gears that couple the rotor to a pair of abutments.
Figure 7:
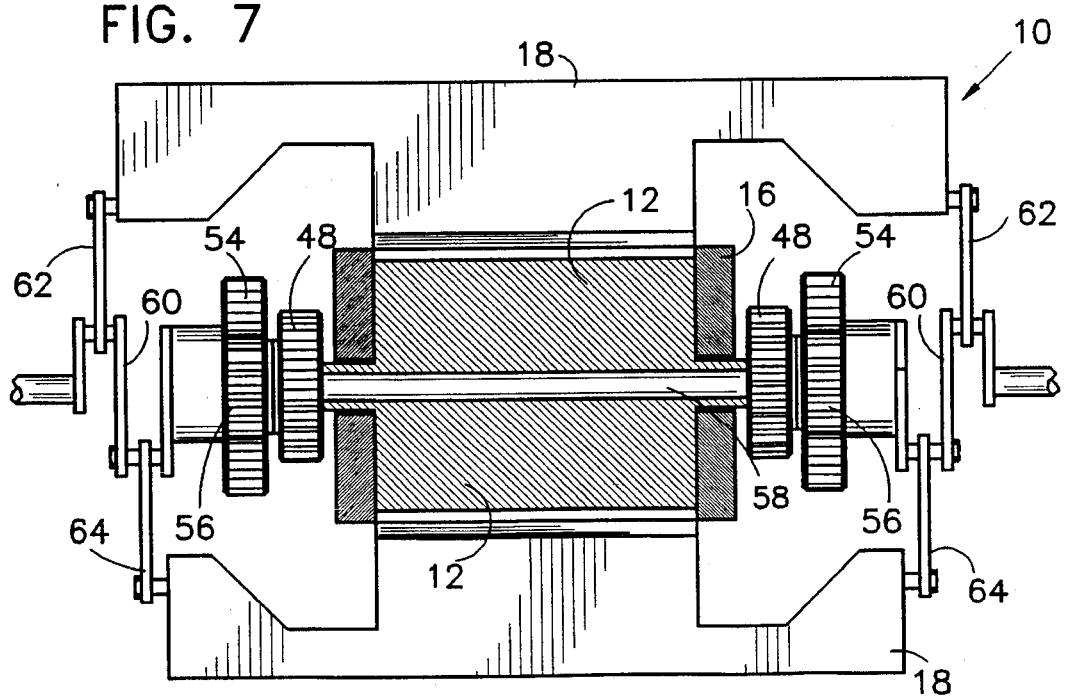
FIG. 7 is a cross-sectional view of FIG. 6, taken at line 7—7, showing a crankshaft connected to the gears and abutments so that the rotation of the rotor is translated into a linear movement of the abutments.
Figure 8:
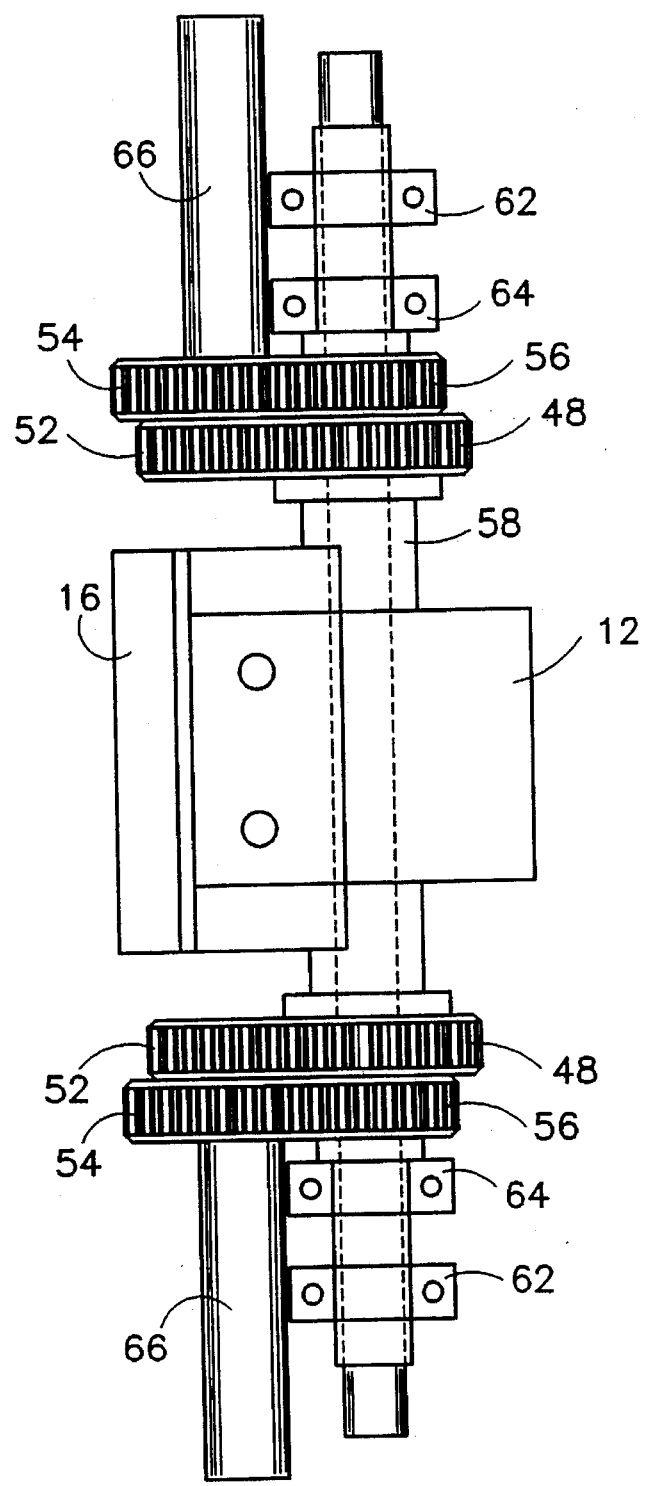
FIG. 8 is a cross-sectional view of FIG. 6 taken at line 8—8.

FIGS. 6–8 show a preferred embodiment of a mechanism that couples the movement of the abutments 18 to the rotation of the rotor 12. Extending from the rotor 12 is a pair of first gears 48 that rotate simultaneously with the rotor 12. Attached to the housing 16 is a pair of second gears 52 that can rotate relative to the housing 16. The second gears 52 mesh with the first gears 48. The diameters of the first gears 48 and the second gears 52 are approximately the same, so that any turning of the first gears 48 produce an equal rotation of the second gears 52. The second gears 52 are connected to third gears 54 that mesh with a pair of fourth gears 56. The fourth gears 56 are connected by a shaft 58 that extends through the rotor 12, such that the fourth gears 56 are coupled together. The shaft 58 rotates independently of the rotor 12. The diameter of the third gears 54 are approximately twice the diameter of the fourth gears 56, wherein the fourth gears 56 rotate two revolutions per every single revolution of the third gears 54.

Figure 9:
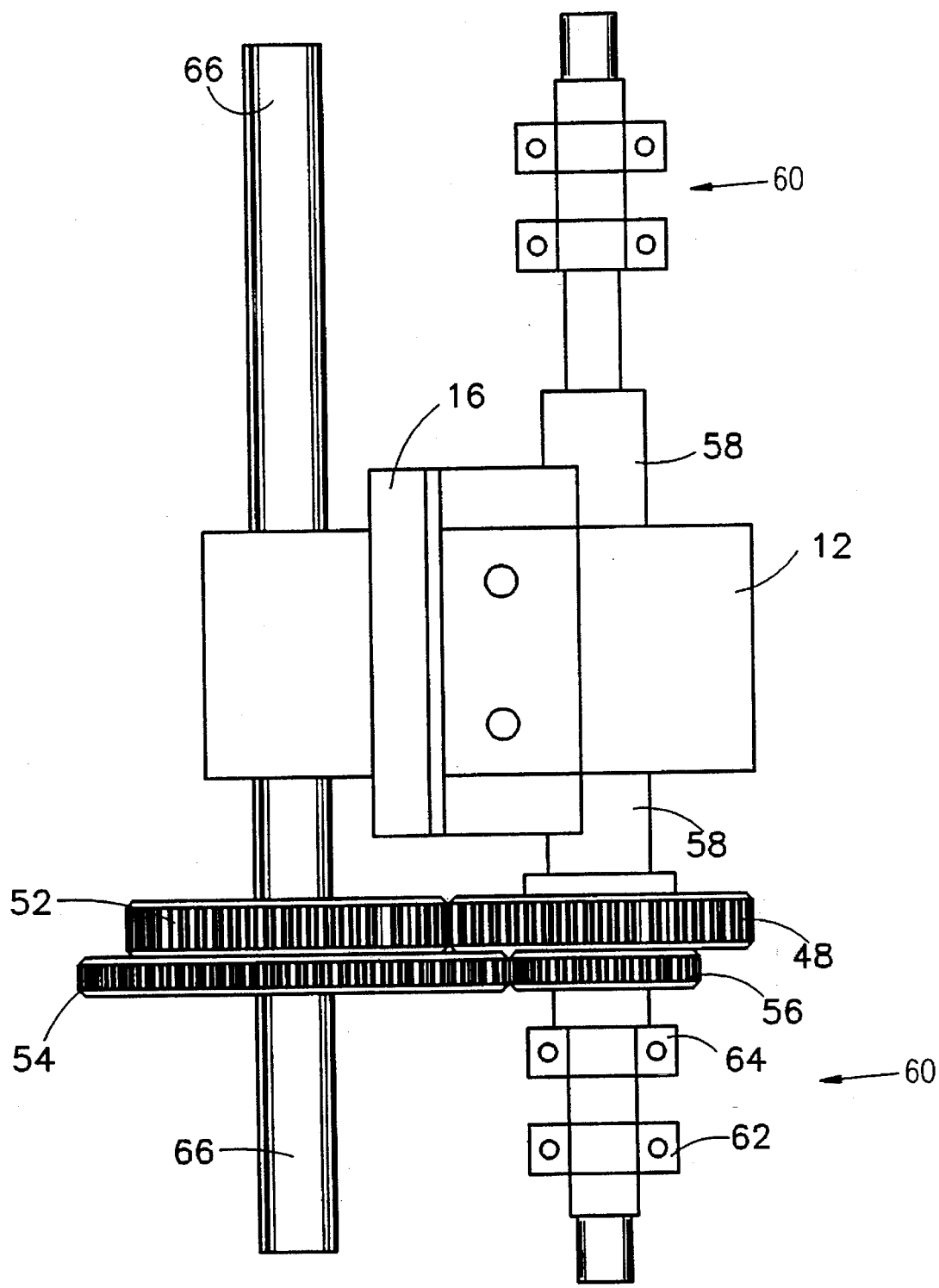
FIG. 9 is a cross-sectional view similar to FIG. 8 showing the incorporation of one output shaft.

Connected to each fourth gear 56 is a crankshaft 60. Pivotally connected to the crankshafts 60 and abutments 18 are a pair of first 62 and second 64 linkage arms as shown in FIG. 7. The crankshafts 60 and linkage arms allow the rotation of the third gears 56 to be translated into a linear movement of the abutments 18, as is well known in the art. The motor 10 may have two output shafts 66 connected to gears 54 as shown in FIG. 8, or one output shaft 66 connected to gears 52 and 54 as shown in FIG. 9. The use of one output shaft 66 reduces the complexity and frictional losses of the motor 10.

Referring to FIGS. 2–4 and 6–8, rotation of the rotor 12 causes the first gears 48 to turn the second gears 52. Rotation of the second gears 52 turns the fourth gears 56 and crankshafts 60, which cause the abutments 18 to move in the directions indicated by the arrows in FIG. 2. The abutments 18 continually move as the rotor 12 rotates within the inner cavity 14. The abutments 18 move from an extended position as shown in FIG. 1, to a retracted position as nearly shown in FIG. 3, to allow the rotor 12 to rotate within the inner cavity 14. The gears have a 2:1 gear ratio so that the abutments 18 move from the extended position to the retracted position, and then back down to the extended position per every half revolution of the rotor 12. The 2:1 gear ratio is required because the rotor 12 has two blade sections 47. If the rotor 12 had three blade sections then a 3:1 gear ratio would be required, because the abutments 18 would have to go up and down three times per every revolution of the rotor 12.

Figure 11:
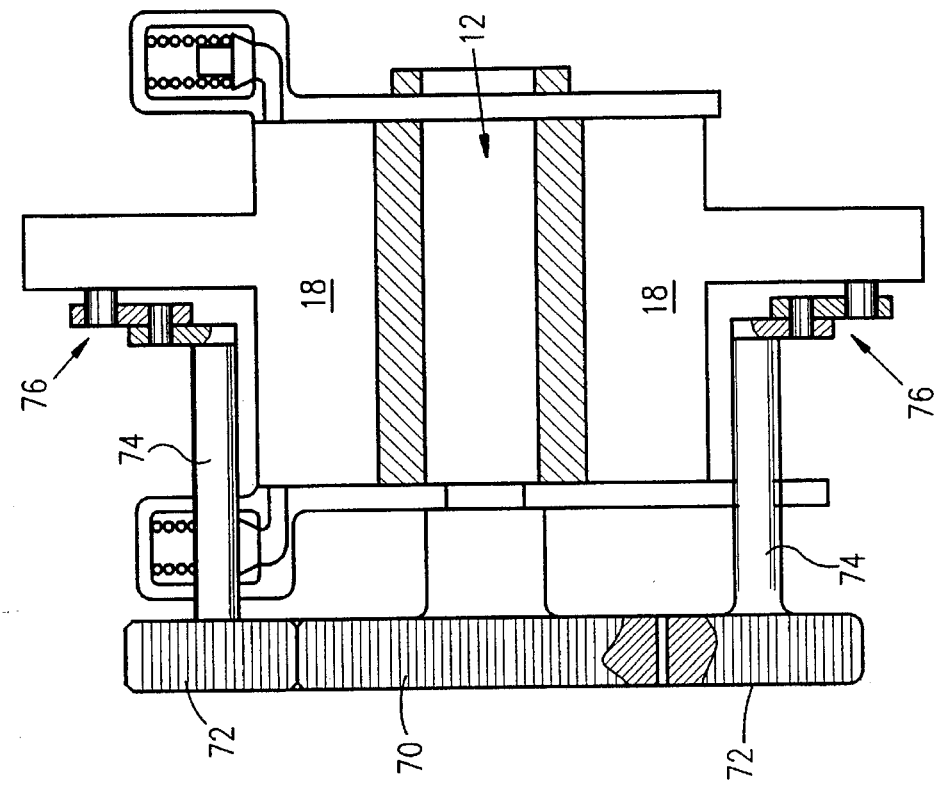
FIG. 11 is a cross-sectional view of FIG. 10 taken at line 11—11.
Figure 10:
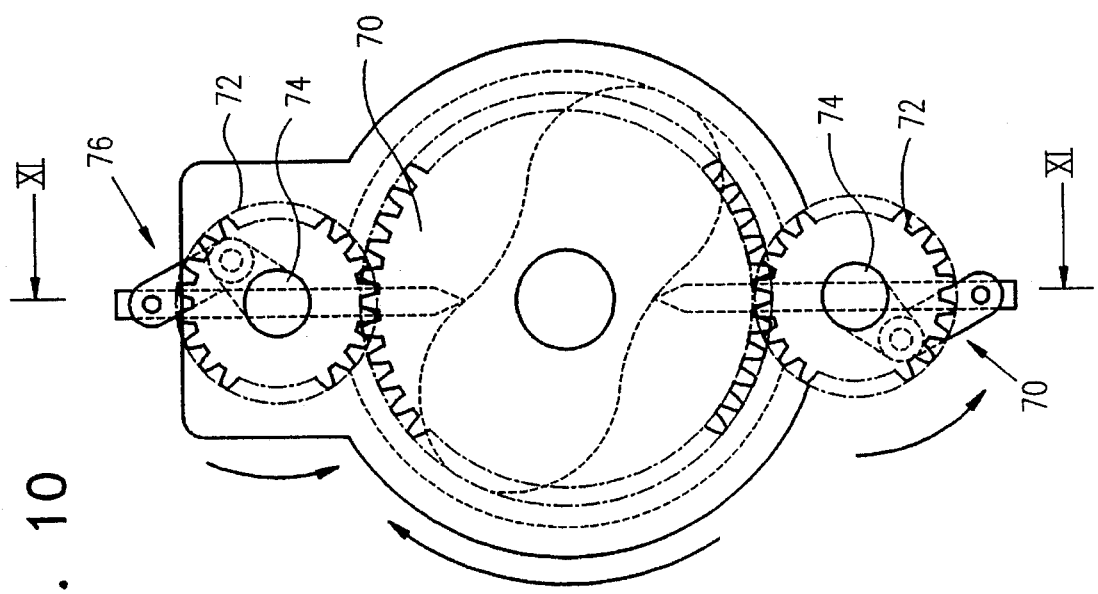
FIG. 10 is a cross-sectional view similar to FIG. 6 showing an alternate embodiment of the rotary engine.

FIGS. 10 and 11 show another embodiment of the present invention. Attached to the rotor 12 is a first gear 70 that is coupled to a pair of second gears 72. The second gears 72 have output shafts 74 that are connected to crankshafts 76. The crankshafts 76 are attached to the abutments 18, so that rotation of the second gears 72 is translated into linear movement of the abutments 18.

The first gear 70 is connected to the rotor 12, to rotate with the rotor 12 and turn the second gears 72. Rotation of the second 70 and first 72 gears moves the abutments 18, so that the abutments 18 are always in contact with the rotor 12. To provide a 2:1 gear ratio, the diameter of the first gear 70 is approximately twice as large as the diameters of the second gears 72.

The rotor 12 preferably has a shape wherein each blade section 47 has a pair of concave surfaces that intersect at the outermost portions of the rotor 12. In the preferred embodiment, the outline of the rotor 12 is defined by the equation:

$$R = B \sqrt{1 - \frac{c^2}{B^2} \times \sin^2(2 \times \alpha)} + c \times \cos(2 \times \alpha)$$

where

R=the local rotor radius length.

α=the local rotor radius angle.

C=the crankshaft radius.

B=the cylinder radius minus the crankshaft radius c.

The above defined outline will insure that the abutments 18 are always in contact with the rotor 12 during the entire motor cycle. This coordinated abutment/rotor movement eliminates the need for a positive pressure seal between the two members as is required in the art. The unique shaped rotor 12 herein disclosed also increases the chamber volume and compression ratio, thereby increasing the efficiency of the motor.

The rotor 12 may be coupled to an output shaft (not shown) so that the motor 10 can power a vehicle or device. In the alternative, the motor 10 can be constructed as a hydraulic or pneumatic pump, wherein the first 28 and third 32 ports receive fluid, and the second 30 and fourth 34 ports supply fluid. The rotor 12 may be rotated by an external power source such that the fluid is pumped from the first 28 and third ports 32 to the second 30 and fourth 34 ports, respectively. As another embodiment, the first 28 and second ports 30 can be connected to a source of steam or pressurized fluid and the third 32 and fourth 34 ports can be attached to a fluid. The steam would then enter the first chamber 20 and push the rotor 12 to allow the steam to flow out of the second port 30. The pressure of the steam would cause the rotor 12 to rotate and pump the fluid from the third port 32 through the fourth port 34.

While certain exemplary embodiments have been described in detail and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A rotary motor, comprising:

housing having an inner cavity and a first, a second, a third and a fourth port;

a rotor operatively connected to said housing so that said rotor can rotate within said inner cavity, said rotor having first and second blade portions adapted to be in constant operative contact with said housing during rotation of said rotor;

a first abutment and a second abutment operatively connected to said housing and extending into said inner cavity such that said abutments are in operative contact with said rotor, said abutments and said rotor being located such that said inner cavity is divided into a first, a second, a third and a fourth chamber;

gear means operatively connected to said rotor and said abutments for moving said abutments within said inner cavity such that said abutments are in constant contact with said rotor while said rotor rotates within said inner cavity; and wherein said gear means includes a first gear operatively connected to said rotor such that said first gear rotates with said rotor, said first gear being operatively connected to at least one second gear to rotate said second gear, said first and second gears having predetermined diameters such that said diameter of said first gear is approximately twice said diameter of said second gear, said gear means further include linkage means operatively connected to said second gear and said abutments for moving said abutments linearly within said inner cavity between an extended position and a retracted position, wherein said abutments move from said extended to said retracted position two times every full revolution of said rotor, said first gear, said second gear and said linkage means being adapted to move said abutments synchronously with said rotor rotation such that said abutments are in constant operative contact with said rotor while said rotor rotates within said inner cavity.

2. The rotary motor as recited in claim 1, wherein said rotor has a profile defined by the equation;

$$R = B \sqrt{1 - \frac{c^2}{B^2} \times \sin^2(2 \times \alpha)} + c \times \cos(2 \times \alpha)$$

wherein R is a local rotor radius length, α is a local rotor radius angle, c is a crankshaft radius and B is a radius of said inner cavity minus said crankshaft radius.

3. A rotary motor, comprising:

housing having an inner cavity and a first, a second, a third and a fourth port;

a rotor operatively connected to said housing so that said rotor can rotate within said inner cavity, said rotor having first and second blade portions adapted to be in constant operative contact with said housing during rotation of said rotor;

first abutment and a second abutment operatively connected to said housing and extending into said inner cavity such that said abutments are in operative contact with said rotor, said abutments and said rotor being located such that said inner cavity is divided into a first, a second, a third and a fourth chamber;

gear means operatively connected to said rotor and said abutments for moving said abutments within said inner cavity such that said abutments are in constant contact with said rotor while said rotor rotates within said inner cavity; and wherein said gear means includes a pair of first gears that extend from said rotor such that said first gears rotate with said rotor, each first gear is operatively connected to a second gear, said first gears and said first gear members having approximately equal diameters, said second gears further having third gears that mesh with a pair of fourth gears, said third gears and said fourth gears having predetermined diameters such that said diameter of said third gears is approximately twice said diameter of said fourth gears, said gear means further include linkage means operatively connected to said fourth gears and said abutments for moving said abutments linearly within said inner cavity between an extended position and a retracted position, wherein said abutments move from said extended position to said retracted position two times every full revolution of said rotor, said gears and said linkage means being adapted to move said abutments synchronously with said rotor rotation such that said abutments are in constant operative contact with said rotor while said rotor rotates within said inner cavity.

4. The rotary motor as recited in claim 3, wherein said linkage means includes a crankshaft extending from each said first gear, a first linkage arm pivotally connected to each said crankshaft and said first abutment and a second linkage arm pivotally connected to each said crankshaft and said second abutment, wherein said crankshafts and said linkage arms translate said rotor rotation into said linear movement of said abutments.

5. A rotary motor, comprising:

a housing having an inner cavity and a first, a second, a third and a fourth port;

a rotor operatively connected to said housing so that said rotor can rotate within said inner cavity, said rotor having first and second blade portions adapted to be in constant operative contact with said housing during rotation of said rotor;

a first abutment and a second abutment operatively connected to said housing and extending into said inner cavity such that said abutments are in operative contact with said rotor, said abutments and said rotor being located such that said inner cavity is divided into a first, a second, a third and a fourth chamber;

gear means operatively connected to said rotor and said abutments for moving said abutments within said inner cavity such that said abutments are in constant contact with said rotor while said rotor rotates within said inner cavity; and wherein said rotor has a first and second outermost portion in operative contact with said housing, said first blade section has a pair of concave surfaces that intersect at said first outermost portion and said second blade section has a pair of concave surfaces that intersect at said second outermost portions, wherein said rotor has a profile, defined by the equation:

$$R = B\sqrt{1 - \frac{c^2}{B^2} \times \sin^2(2 \times \alpha)} + c \times \cos(2 \times \alpha)$$

wherein R is a local rotor radius length, $\alpha$ is a local rotor radius angle, c is a crankshaft radius and B is a radius of said inner cavity minus said crankshaft radius.

6. A rotary motor, comprising:

a housing having an inner cavity and a first, a second, a third and a fourth port;

a rotor operatively connected to said housing so that said rotor can rotate within said inner cavity, said rotor having a first and second blade sections each with a pair of concave surfaces that extend from a center portion of said rotor to first and second outermost portions of said rotor respectively, said first and second outermost portions being adapted to remain in constant operative contact with said housing during rotation of said rotor;

a first and a second abutment operatively connected to said housing and extending into said inner cavity such that said abutments are in operative contact with said rotor, said abutments and said rotor being located such that said inner cavity is divided into a first, a second, a third and a fourth chamber; and, a pair of first gears operatively connected to said rotor to rotate with said rotor;

a pair of second gears operatively connected to said first gears;

a pair of third gears connected to said second gears;

a pair of fourth gears operatively connected to said third gears;

a pair of crankshafts attached to said fourth gears and operatively connected to said abutments by linkage arms such that said rotation of said fourth gears is translated into a linear movement of said abutments, said rotor, abutments and gears being constructed such that said abutments move relative to said rotor while said rotor is rotating and said abutments remain in constant contact with said rotor during said rotor rotation.

7. The rotary motor as recited in claim 6, wherein said third gears and said fourth gears have a predetermined diameter such that said diameter of said third gears is approximately twice said diameter of said fourth gears.

8. The rotary motor as recited in claim 7, wherein said rotor has a profile defined by the equation;

$$R = B\sqrt{1 - \frac{c^2}{B^2} \times \sin^2(2 \times \alpha)} + c \times \cos(2 \times \alpha)$$

wherein R is a local rotor radius length, $\alpha$ is a local rotor radius angle, c is a crankshaft radius and B is a radius of said inner cavity minus said crankshaft radius.

9. A rotary internal combustion engine, comprising:

a housing having an inner cavity, an air intake port, an exhaust port and second chamber, said housing further having a combustion chamber in fluid communication with said inner cavity through a combustion intake port and a combustion exhaust port, said combustion exhaust port being open during an entire operating cycle;

an intake valve operatively connected to said combustion intake port to allow fluid communication only in one direction from said second chamber to said combustion chamber;

a rotor operatively connected to said housing so that said rotor can rotate within said inner cavity, said rotor having first and second blade sections adapted to be in constant operative contact with said housing during rotation of said rotor;

a first and a second abutment operatively connected to said housing and extending into said inner cavity such that said abutments are in operative contact with said rotor, said abutments and said rotor being located within said housing such that said inner cavity is divided into a first, a second, a third and a fourth chamber; and, gear means operatively connected to said rotor and said abutments for moving said abutments within said inner cavity such that said abutments are in constant contact with said rotor while said rotor rotates within said inner cavity.

10. The rotary engine as recited in claim 9, wherein said gear means includes a first gear operatively connected to said rotor such that said first gear rotates with said rotor, said first gear being operatively connected to at least one second gear to rotate said second gear, said first and second gears having predetermined diameters such that said diameter of said first gear is approximately twice said diameter of said second gear, said gear means further include linkage means operatively connected to said second gear and said abutments for moving said abutments linearly within said inner cavity between an extended position and a retracted position, wherein said abutments move from said extended position to said retracted position two times every full revolution of said rotor, said first gear, said second gear and said linkage means being adapted to move said abutments synchronously with said rotor rotation such that said abutments are in constant operative contact with said rotor while said rotor rotates within said inner cavity.

11. The rotary motor as recited in claim 10, wherein said rotor has a profile defined by the equation;

$$R = B \sqrt{1 - \frac{c^2}{B^2} \times \sin^2(2 \times \alpha)} + c \times \cos(2 \times \alpha)$$

wherein R is a local rotor radius length, $\alpha$ is a local rotor radius angle, c is a crankshaft radius and B is a radius of said inner cavity minus said crankshaft radius.

12. The rotary motor as recited in claim 9, wherein said gear means includes a pair of first gears that extend from said rotor such that said first gears rotate with said rotor, each first gear is operatively connected to a second gear, said first gears and said first gear members having approximately equal diameters, said second gears further having third gears that mesh with a pair of fourth gears, said third gears and said fourth gears having predetermined diameters such that said diameter of said third gears is approximately twice said diameter of said fourth gears, said gear means further include linkage means operatively connected to said fourth gears and said abutments for moving said abutments linearly within said inner cavity between an extended position and a retracted position, wherein said abutments move from said extended position to said retracted position two times every full revolution of said rotor, said gears and said linkage means being adapted to move said abutments synchronously with said rotor rotation such that said abutments are in constant operative contact with said rotor while said rotor rotates within said inner cavity.

13. The rotary motor as recited in claim 12, wherein said linkage means includes a crankshaft extending from each said first gear, a first linkage arm pivotally connected to each said crankshaft and said first abutment and a second linkage arm pivotally connected to each said crankshaft and said second abutment, wherein said crankshafts and said linkage arms translate said rotor rotation into said linear movement of said abutments.

14. The rotary motor as recited in claim 9, wherein said rotor has a first and second outermost portions in operative contact with said housing, said first blade section has a pair of concave surfaces that intersect at said first outermost portion and said second blade section has a pair of concave surfaces that intersect at said second outermost portion.

15. The rotary motor as recited in claim 14, wherein said rotor has a profile defined by the equation;

$$R = B \sqrt{1 - \frac{c^2}{B^2} \times \sin^2(2 \times \alpha)} + c \times \cos(2 \times \alpha)$$

wherein R is a local rotor radius length, $\alpha$ is a local rotor radius angle, c is a crankshaft radius and B is a radius of said inner cavity minus said crankshaft radius.

16. The rotary motor as recited in claim 10, further comprising an output shaft connected to said second gear.

17. The rotary motor as recited in claim 12, further comprising a pair of output shafts connected to said third gears.

18. A rotary internal combustion engine, comprising:

a housing having an inner cavity, an air intake port, an exhaust port and a second chamber, said housing having a combustion chamber in fluid communication with said inner cavity through a combustion intake port and a combustion exhaust port, said combustion exhaust port being open during an entire operating cycle;

an intake valve operatively connected to said combustion intake port to allow fluid communication only in one direction from said second chamber to said combustion chamber;

a rotor operatively connected to said housing so that said rotor can rotate within said inner cavity, said rotor having first and second blade sections each with a pair of concave surfaces that extend from a center portion of said rotor to said first and second outermost portions of said rotor respectively, said first and second outermost portions being adapted to remain in constant contact with said housing during rotation of said rotor;

a first and a second abutment operatively connected to said housing and extending into said inner cavity such that said abutments are in constant contact with said rotor, said abutments and said rotor being located within said housing such that said inner cavity is divided into a first, a second, a third and a fourth chamber; and, a pair of first gears operatively connected to said rotor to rotate with said rotor;

a pair of second gears operatively connected to said first gears;

a pair of third gears connected to said second gears;

a pair of fourth gears operatively connected to said third gears;

a pair of crankshafts attached to said fourth gears and operatively connected to said abutments by linkage arms such that said rotation of said fourth gears is translated into a linear movement of said abutments, said rotor, abutments and gears being constructed such that said abutments move relative to said rotors while said rotor is rotating and said abutments remain in constant operative contact with said rotor during said rotor rotation.

19. The rotary motor as recited in claim 18, wherein said rotor has a profile defined by the equation;

$$R = B \sqrt{1 - \frac{c^2}{B^2} \times \sin^2(2 \times \alpha)} + c \times \cos(2 \times \alpha)$$

wherein R is a local rotor radius length, α is a local rotor radius angle, c is a crankshaft radius and B is a radius of said inner cavity minus said crankshaft radius.

20. The rotary engine as recited in claim 19, wherein said third gears and said fourth gears have a predetermined diameter such that said diameter of said third gears are approximately twice said diameter of said fourth gears.

21. A method of operation of an internal combustion engine, comprising the steps of:

a) providing:

a housing having an inner cavity, an air intake port, an exhaust port and a second chamber port, said housing having a combustion chamber in fluid communication with said inner cavity through a combustion intake port and a combustion exhaust port, said combustion exhaust port being open during an entire operating cycle;

an intake valve operatively connected to said combustion intake port to allow fluid communication only in one direction from said second chamber to said combustion chamber;

a rotor operatively connected to said housing so that said rotor can rotate within said inner cavity, said rotor having first and second blade sections each with a pair of concave surfaces that extend from a center portion of said rotor to said first and second outermost portions being adapted to remain in constant operative contact with said housing during rotation of said rotor;

a first and second abutment operatively connected to said housing and extending into said inner cavity such that said abutments are in constant contact with said rotor, said abutments and said rotor being located within said housing such that said inner cavity is divided into a first, a second, a third and a fourth chamber;

gear assembly operatively connected to said rotor and said abutments for moving said abutments within said inner cavity such that said abutments are in constant contact with said rotor while said rotor rotates within said inner cavity, said gear assembly including a first gear operatively connected to said rotor such that said first gear rotates with said rotor, said first gear being operatively connected to at least one second gear to rotate said second gear, said first and second gears having predetermined diameters such that said diameter of said first gear is approximately twice said diameter of said second gear, said gear assembly including a linkage means operatively connected to said second gear and said abutments for moving said abutments linearly within said inner cavity between an extended position and a retracted position, wherein said abutments move from said extended position to said retracted position two times every full revolution of said rotor, said first gear, said second gear and said linkage means being adapted to move said abutments synchronously with said rotor rotation such that said abutments are in constant operative contact with said rotor while said rotor rotates within said inner cavity;

b) rotating said rotor such that air is drawn into said first chamber;

c) rotating said rotor further such that said air is compressed within said second chamber, said air being compressed until said air pressure is greater than said combustion chamber pressure, wherein said compressed air flows past said intake valve into said combustion chamber;

d) adding fuel to said combustion chamber; and;

e) combusting said air and said fuel in said combustion chamber to produce a pressurized gas, wherein said pressurized gas flows from said combustion chamber to said third chamber.

\* \* \* \* \*